United States Patent
Byers et al.

(10) Patent No.: US 10,167,092 B2
(45) Date of Patent: Jan. 1, 2019

(54) PERCH FOR SCREENING DRONES

(71) Applicant: Cisco Technology, Inc., San Jose, CA (US)

(72) Inventors: Charles Calvin Byers, Wheaton, IL (US); Gonzalo A. Salgueiro, Holly Springs, NC (US); Joseph Michael Clarke, Cary, NC (US)

(73) Assignee: Cisco Technology, Inc., San Jose, CA (US)

( * ) Notice: Subject to any disclaimer, the term of this patent is extended or adjusted under 35 U.S.C. 154(b) by 435 days.

(21) Appl. No.: 15/133,075

(22) Filed: Apr. 19, 2016

(65) Prior Publication Data

US 2017/0050748 A1    Feb. 23, 2017

Related U.S. Application Data

(60) Provisional application No. 62/207,221, filed on Aug. 19, 2015.

(51) Int. Cl.
*B64F 1/36* (2017.01)
*H04L 29/08* (2006.01)
(Continued)

(52) U.S. Cl.
CPC .............. *B64F 1/36* (2013.01); *B64C 39/024* (2013.01); *B64F 1/12* (2013.01); *B64F 1/22* (2013.01);
(Continued)

(58) Field of Classification Search
CPC ...... B64F 1/32; B64F 1/36; B64F 1/12; B64F 1/22; B64C 39/024; G08G 5/0013; H04L 67/12; H04V 4/021
See application file for complete search history.

(56) References Cited

U.S. PATENT DOCUMENTS

| | | | |
|---|---|---|---|
| 6,960,750 B2 * | 11/2005 | Doane | G02B 5/124 244/135 A |
| 8,167,234 B1 * | 5/2012 | Moore | B64C 37/00 244/17.23 |

(Continued)

OTHER PUBLICATIONS

Press Release: May 5, 2015, "Exelis and FAA—designated Test Sites to research the safe integration of unmanned aircraft into the national airspace system", 2 pages. http://www.exelisinc.com/news/pressreleases/Pages/Exelis-and-FAAdesignated-Test-Sites-to-research-the-safe-integration-of-unmanned-aircraft-into-the-national-airspace-system.aspx.

(Continued)

*Primary Examiner* — Justin M Benedik
(74) *Attorney, Agent, or Firm* — Patterson + Sheridan, LLP

(57) ABSTRACT

Embodiments herein describe a perch for screening drones before permitting access to a restricted geographic region. The perch may include various scanners for evaluating the payload of the drone, its hardware, and flight control software. In one embodiment, the screening perch includes a conveyor belt that moves the drone through various scanners or stages in the perch. In one embodiment, the perch ensures the drone is properly configured to enter the restricted geographic region. The region may include multiple requirements or criteria that must be satisfied before a drone is permitted to enter. For example, the drone may need a signed flight plan, cargo that is less than a certain percentage of its weight, or an approved flight controller before being permitted into the restricted region. In this manner, the perch serves as a controlled entrance point for drones attempting to enter the restricted region.

20 Claims, 4 Drawing Sheets

(51) Int. Cl.
- *B64F 1/22* (2006.01)
- *B64F 1/12* (2006.01)
- *B64C 39/02* (2006.01)
- *G08G 5/00* (2006.01)
- *H04W 4/021* (2018.01)

(52) U.S. Cl.
CPC ........... *G08G 5/0013* (2013.01); *H04L 67/12* (2013.01); *H04W 4/021* (2013.01); *B64C 2201/146* (2013.01)

(56) References Cited

U.S. PATENT DOCUMENTS

| | | | |
|---|---|---|---|
| 8,511,606 B1* | 8/2013 | Lutke | B64C 39/028 244/100 R |
| 9,139,310 B1* | 9/2015 | Wang | B64F 1/36 |
| 9,284,062 B2* | 3/2016 | Wang | B60L 11/1809 |
| 9,483,950 B2* | 11/2016 | Wang | G05D 1/0214 |
| 2014/0254896 A1 | 9/2014 | Zhou et al. | |
| 2015/0379874 A1* | 12/2015 | Ubhi | G01S 5/0027 701/3 |
| 2016/0253907 A1* | 9/2016 | Taveira | G08G 5/006 701/3 |

OTHER PUBLICATIONS

Press Release: Reuters, Mar. 10, 2015, "Exelis to offer drone-tracking system as industry, NASA seek to ease safety fears", 5 pages. http://www.reuters.com/article/us-usa-drones-exelis-insight-idUSKBN0M60BP20150310.

"Symphony RangeVue: Roadmap to Capabilities", retrieved Apr. 19, 2016, 2 pages http://www.exelisinc.com/solutions/symphony%20rangevue/Pages/default.aspx.

U.S. Appl. No. 14/621,927, entitled "Smart Postal Box in Support of Autonomous Delivery Nodes", filed Feb. 13, 2015.

* cited by examiner

US 10,167,092 B2

PERCH FOR SCREENING DRONES

CROSS-REFERENCE TO RELATED APPLICATIONS

This application is a non-provisional of co-pending U.S. patent application Ser. No. 62/207,221, filed Aug. 19, 2015. The aforementioned related patent application is herein incorporated by reference in its entirety.

TECHNICAL FIELD

Embodiments presented in this disclosure generally relate to screening drones, and more specifically, to ensuring a drone satisfies one or more criteria before entering a restricted geographic region.

BACKGROUND

The use of drones (i.e., unmanned vehicles) has exploded in the last decade. As drones become more prevalent, the potential that drones may damage a structure or harm a person (whether intentionally or unintentionally) increases. For example, using an autonomous drone (i.e., a drone not actively controlled by a human) in a city with tall building may result in the drone striking a building if not equipped with proper flight controller for navigating between the buildings. Moreover, using a drone near an airport may damage an airplane on takeoff or approach. Further still, drones may be used for nefarious purposes to harm buildings or humans (e.g., a government building or a sporting event). Mitigating the risk of accidental or intentional damage that can result from operating a drone is desired.

BRIEF DESCRIPTION OF THE DRAWINGS

So that the manner in which the above recited features of the present disclosure can be understood in detail, a more particular description of the disclosure, briefly summarized above, may be had by reference to embodiments, some of which are illustrated in the appended drawings. It is to be noted, however, that the appended drawings illustrate only typical embodiments of this disclosure and are therefore not to be considered limiting of its scope, for the disclosure may admit to other equally effective embodiments.

To facilitate understanding, identical reference numerals have been used, where possible, to designate identical elements that are common to the figures. It is contemplated that elements disclosed in one embodiment may be beneficially utilized on other embodiments without specific recitation.

DESCRIPTION OF EXAMPLE EMBODIMENTS

Overview

Figure 1:
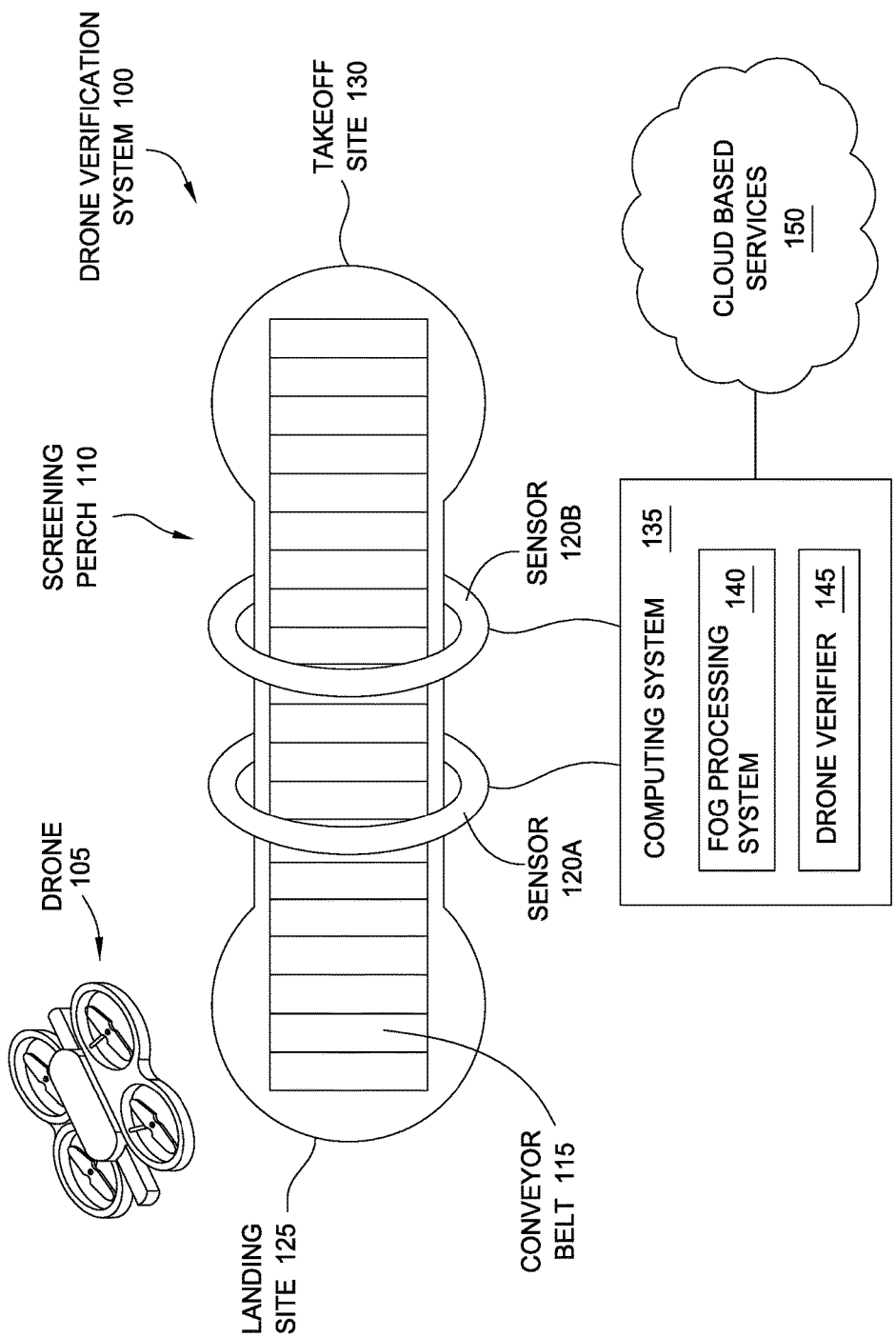
FIG. 1 is a drone verification system that includes a screening perch, according to one embodiment described herein.

One embodiment presented in this disclosure is a screening perch that includes a landing site configured to receive a drone for screening, wherein the drone is an unmanned vehicle and a sensor configured to scan at least a portion of the drone. The screening perch includes a drone verifier communicatively coupled to the sensor and is configured to evaluate data outputted from the sensor when scanning the portion of the drone and determine whether the data satisfies a predefined criteria corresponding to a restricted geographic region. Upon determining the predefined criteria is satisfied, the drone verifier is configured to permit the drone to enter the restricted geographic region.

Another embodiment presented in this disclosure is a drone screening system that includes a plurality of screening perches disposed at a shared boundary between a first geographic region and a second geographic region. Each of the plurality of screening perches includes a sensor configured to scan at least a portion of a drone, where the drone is an unmanned vehicle and a drone verifier configured to authorize the drone to travel from the first geographic region to the second geographic region based on data outputted by the sensor.

Another embodiment presented in this disclosure is method that includes receiving a drone at a screening perch, where the drone is an unmanned vehicle and scanning at least a portion of the drone. The method includes evaluating data outputted when scanning the portion of the drone and determining whether the data satisfies a predefined criteria corresponding to a restricted geographic region. Upon determining the predefined criteria is satisfied, the method includes permitting the drone to leave the screening perch and enter the restricted geographic region.

Example Embodiments

Embodiments herein describe a perch for screening drones before permitting access to a restricted geographic region. The perch (also referred to as a screening perch) may include various sensors or scanners for evaluating the payload of the drone, its hardware, and flight control software. In one embodiment, the screening perch moves the drone through or past sensors or stages in the perch. In one embodiment, the screening perch ensures the drone is properly configured to enter the restricted geographic region. The region may include multiple requirements or criteria that must be satisfied before a drone is permitted to enter. For example, the drone may need a signed flight plan, cargo that is less than a certain percentage of its weight, or an approved flight controller before being permitted into the restricted region. In this manner, the screening perch serves as a controlled entrance point for drones attempting to enter the restricted region.

In one embodiment, the screening perch includes a conveyor belt that moves the drone past the various sensors. In addition to criteria discussed above, the sensors may also determine if the drone has a defect or has a hazardous payload. For example, the sensors may perform a chemical/biological check on the drone or use a millimeter or X-ray scanner to evaluate the payload for hazardous or unapproved materials (i.e., contraband). Once cleared, the screening perch informs the drone it can enter the restricted region. In one embodiment, the drone is given an updated flight plan for traversing the restricted geographic region.

FIG. 1 is a drone verification system 100 that includes a screening perch 110, according to one embodiment described herein. In addition to the perch 110, the system 100 includes a drone 105 and computing system 135. The screening perch 110 includes a designated landing site 125 and takeoff site 130. The landing and takeoff sites 125 and 130 generally illustrate locations on the screening perch 110 where a drone enters and exits the perch 110 regardless if the drone is a UAV, an unmanned car, a boat, etc. Once at the landing site 125, a conveyor belt 115 moves the drone 105 from the landing site 125 to the takeoff site 130. As shown, the conveyor belt 115 moves the drone through sensors 120 which scan or evaluate a portion of the drone 105. For example, the sensors 120 may be X-ray systems, millimeter wave scanners, biological/chemical sniffers, magnetometers, visible light cameras, infrared cameras, and the like with sensing regions. In one embodiment, the sensors 120 are used to evaluate the payload of the drone to identify any unsafe or harmful materials.

In one embodiment, the sensors 120 evaluate the software or hardware of the drone. For example, the sensors 120 may include an antenna for wirelessly communicating with an antenna on the drone 105 to determine whether the flight control system in the drone satisfies the minimum requirements for a restricted geographic region or for validating the drone 105 using a flight plan. Moreover, the screening perch 110 may determine an ID for the drone 105 such as a tail number or a model number to determine the hardware and/or software in the drone 105.

The computing system 135 includes a fog processing system 140 and a drone verifier 145. The fog processing system 140 represents one or more processing elements which may each include any number of processing cores. In one embodiment, the fog processing system 140 includes a distributed computing network that provides processing, networking, and storage. In one embodiment, the fog processing system 140 can communicate with the screening perch 110 directly using a wired or wireless connection without using a wide access network (e.g., the Internet). Thus, even if the internet connection fails, the fog processing system 140 can still perform the functions described herein.

The drone verifier 145 may be software or hardware in the computing system 135 that processes the data provided by sensors 120 and determines whether to permit the drone 105 to enter into a restricted geographic region. In one embodiment, the drone verifier 145 stores a list of steps or criteria that must be satisfied before the drone 105 can enter into the restricted geographic region. For example, the verifier 145 may check to ensure the flight plan is approved and signed, the drone ID matches the ID in the flight plan, the payload includes what is listed in the flight plan, the drone is not carrying any dangerous materials, the flight control system is suitable for the terrain in the restricted geographic region, or the software on the drone is the required version and has not been tampered with.

The drone verification system 100 also includes cloud based services 150 which can be accessed using the Internet. These services 150 may include a government database that permits the drone verifier 145 to generate or verify a flight plan for the drone 105. In another example, the cloud based services 150 may permit the verifier 145 to access applications that perform complicated evaluations on the sensor data. For example, using the fog processing system 140, the drone verifier 145 may perform a quick scan of x-ray data to identify the material in the payload, and if anything suspicious is found, send the x-ray data to the cloud based service 150 for more advanced analysis of the data. Cloud based services 150 can also link the drone verification system 100 with additional elements of the autonomous vehicle control network, including radar stations, other sensors, government databases, and manufacturers of the system's equipment.

The embodiments herein describe the drone 105 as an unmanned aerial vehicle (UAV) but are not limited to such. The perch 110 may also be used to screen other types of drones such as wheeled drones (e.g., driverless cars) or unmanned watercraft. Of course, the dimensions and physical arrangement of the perch 110 may change depending on the application. If the perch 110 screens UAVs, the perch 110 may be 1-5 meters in length (e.g., from right to left) and 1-2 meters wide.

Figure 2A:
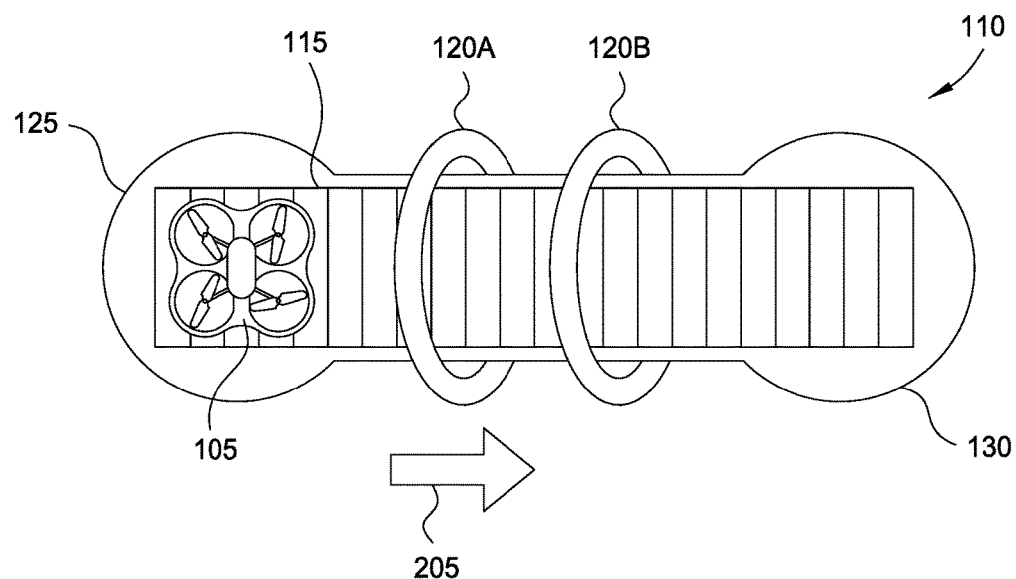
FIGS. 2A and 2B illustrate evaluating a drone using a screening perch, according to one embodiment described herein.
Figure 2B:
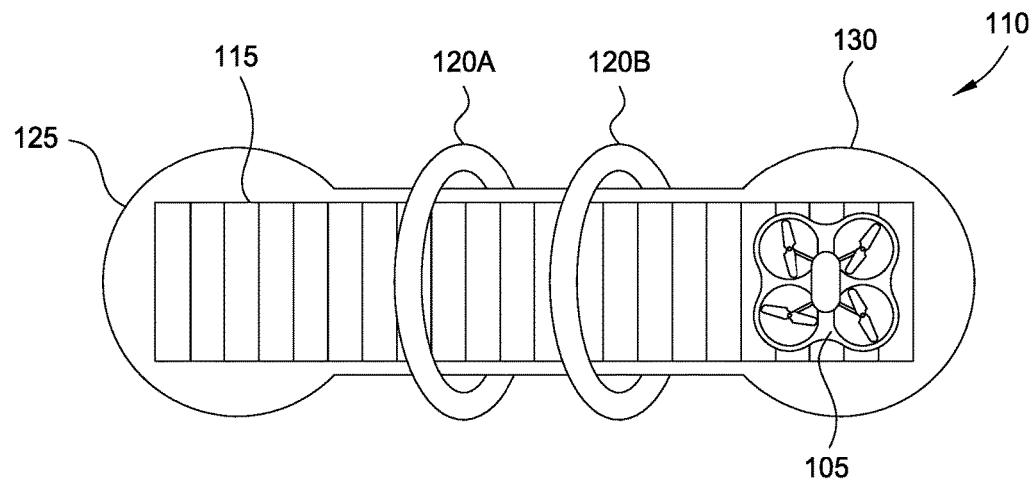

FIGS. 2A and 2B illustrate evaluating a drone 105 using a screening perch 110, according to one embodiment described herein. As shown, the drone 105 lands on the conveyor belt 115 in the landing site 125. In one embodiment, the conveyor belt 115 includes retaining elements (not shown) for holding the drone 105 on the belt 115. The retaining elements may ensure the drone 105 does not fall of the belt 115 and get damaged when moving along the belt 115. Moreover, the retaining elements ensure the drone 105 cannot leave until the drone verifier 145 has determined the drone 105 has satisfied the criteria for the restricted geographic region. For example, if the drone software malfunctions or a user tries to remotely fly the drone away from the perch 110, the retaining elements prevent the drone 105 from taking off.

In one embodiment, the retaining elements are mechanical fasteners that clip onto, for example, a leg or legs of the drone. In another embodiment, the retaining elements are electromagnets that activate once the drone 105 lands and deactivate after the drone 105 is cleared for entering the restricted region. Thus, the retaining elements may be active as the conveyor belt 115 moves the drone 105 through the sensors 120 as shown by arrow 205 in FIG. 2A.

In FIG. 2B, the drone 105 has passed through the sensors 120 and reached the end of the conveyor belt 115—i.e., the takeoff site 130. In one embodiment, the screening perch 110 uses the retaining elements to prevent the drone from taking off until the drone verifier has ensured the drone 105 is properly configured to enter into the restricted geographic region. If the number of requirements for entering the restricted region is small, the drone verifier may have already determined whether the drone 105 is able to enter the restricted region by the time the drone reaches the takeoff site 130. For example, if the drone verifier determines only whether the payload is within a certain percentage of the total weight of the drone 105 and that the drone ID matches the ID in the flight plan, this analysis may take only several seconds to perform. However, if the drone verifier also tests the flight controller and performs a chemical swab of the payload, these tests may take more than a minute to complete. Once cleared, the retaining elements are deactivated and the drone verifier sends a message to the flight controller in the drone 105 indicating it can enter the restricted geographic region. The drone verifier may also inform the central drone control authorities that the cleared drone has passed screening and should not cause alarms if the drone is detected in the restricted region.

In one embodiment, if the drone does not pass the criteria for entering the restricted region, the screening perch 110 may detain the drone. For example, the conveyor belt 215 may pass the drone 105 to a separate location on the perch 110 for storing the drone 105. In one example, the perch 110 may move the drone 105 into an isolation box for later pickup and evaluation by a human technician if a hazardous material is detected on the drone 105. However, in another embodiment, if the drone 105 fails, the drone verifier may permit the drone 105 to takeoff but instruct the drone 105 that it cannot enter into the restricted region. For example, the verifier may instruct the drone 105 to return to its home base or its last departure point.

The embodiments herein may include communicating with a drone-enforcement system that ensures unauthorized drones (i.e., drones that do not pass successfully through the perch 110) enter into the restricted geographic region. The drone-enforcement system may catch, disable, or override the drones that enter the restricted region (or deviate from their flight plan in the region) without first being authorized by the drone verifier on the perch 110.

Although FIGS. 2A and 2B illustrate using a conveyor belt 115 as an actuator to move the drone, other types of actuators may also be used such as a lead screw of hydraulic actuator to move the drone through the sensors 120. In other embodiments, the drone 105 may remain stationary on the screening perch 110 while the sensors 120 move around the drone 105. That is, the landing site 125 may include moving sensors—e.g., a moving millimeter wave scanner—and stationary sensors (e.g., a scale) for measuring the information required to determine if the drone 105 can enter the restricted region. However, one advantage of using a conveyor belt 115 is that the screening process can be broken up into stages of a pipeline so that different drones 105 can be at different stages. For example, the sensors 120 can represent separate stages that can independently perform respective tests on two drones 105 simultaneously. In this manner, the perch 110 can screen multiple drones 105 in parallel.

In another embodiment, instead of using a conveyor belt 115, the screening perch 110 may permit a drone to fly through the sensors 120, perhaps subject to speed restrictions and other constraints imposed by the drone verifier 145 to ensure an accurate screening. However, the screening perch 110 may be an enclosed structure so that the drone cannot leave until authorized by the drone verifier 145. For example, once verified, the screening perch 110 opens a door or gate that permits the drone to leave.

Figure 3:
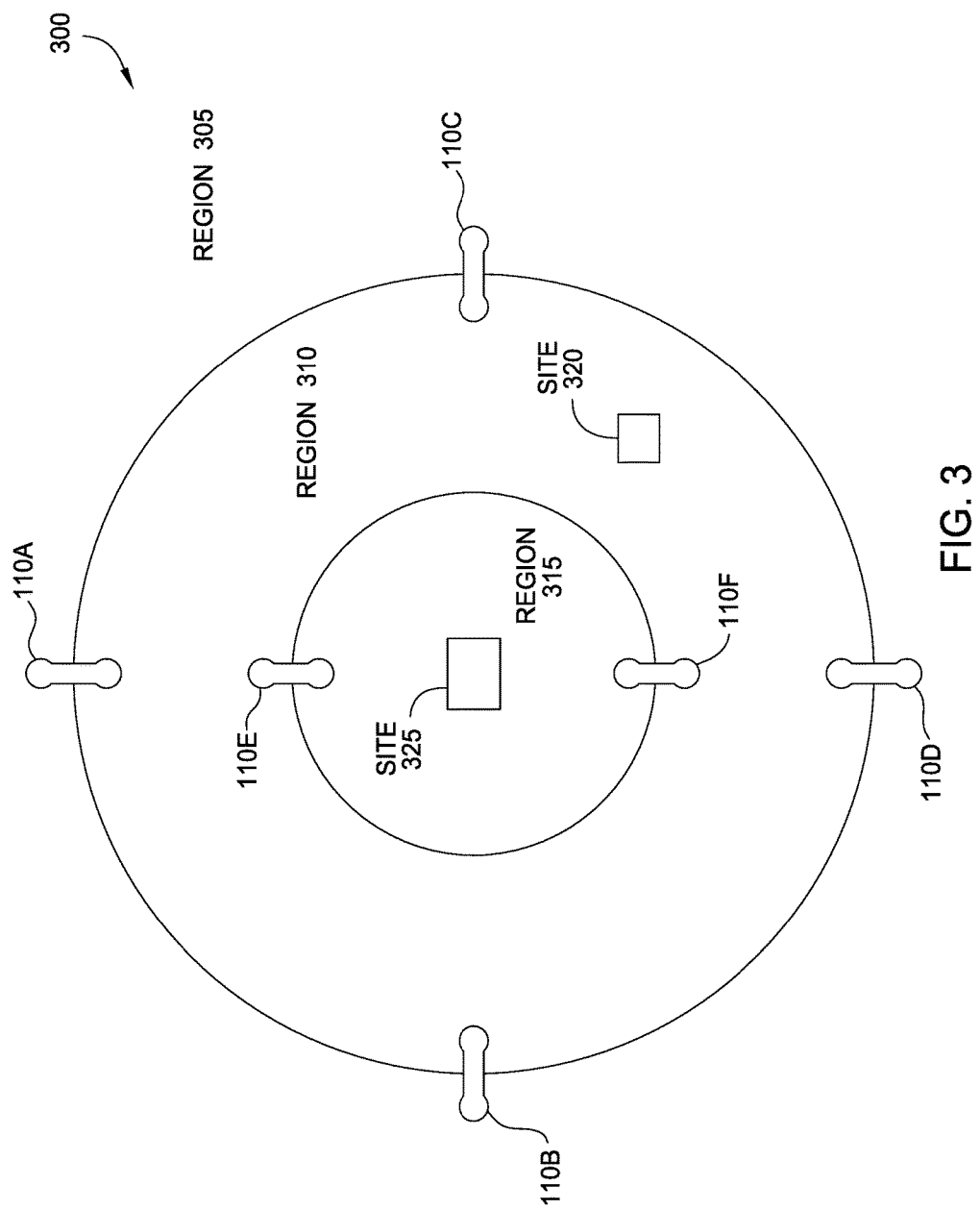
FIG. 3 illustrates using screening perches to control drone access to restricted geographic regions, according to one embodiment described herein.

FIG. 3 illustrates using screening perches 110 to control drone access to restricted geographic regions, according to one embodiment described herein. In FIG. 3, an area 300 is subdivided into three regions: region 305, region 310, and region 315. In one embodiment, the rules governing drone use in each of the regions is different. Stated differently, the criteria for entering the regions may vary. In one example, region 305 may not have any rules for flying drones. That is, commercial as well as private operators can fly drones without worrying about rules established by either the government or a private entity controlling the air space in region 305. Region 310, however, may have a set of criteria or requirements for drones traveling in this geographic area. For example, region 310 may include a metropolitan area that includes tall buildings at site 320. As such, any drone entering into region 310 may need to include building avoidance software that permits the drone to detect and avoid buildings in its flight path.

Region 315 may include more restrictions than region 310. Because region 315 is surrounded by region 310, region 315 inherently inherits the restrictions of region 310 since drones must first pass through region 310 to enter region 315. In addition, region 315 may require that drones pass a chemical and/or biological scan before entering. For example, site 325 may include government buildings or a sports venue. In another example, the site 325 may be an airport which means the drones entering region 315 must satisfy governmental rules controlling regions near commercial aviation.

FIG. 3 illustrates various perches 110 for passing between the regions. Specifically, to enter region 310 from region 305, a drone must pass through the perch 110A, 110B, 110C, or 110D. In one embodiment, because this subset of the perches 110 all control entry into the same region—i.e., region 310—these perches may evaluate the drones to ensure they satisfy the same criteria. Stated differently, regardless of which of the four perches 110A-D the drone uses to enter region 310, the perches 110 perform the same evaluation to determine if the drone can enter. For example, if region 310 requires a drone to have flight controller able to detect and avoid buildings as well as carry a payload that is less than 50% of the drones total weight, the perches 110A-D all perform this evaluation. Once a drone passes through any one of the perches 110A-D, it is authorized to enter region 310.

If the destination of the drone is within region 310 (but not region 315), the drone can proceed to the destination and drop off its payload, pick up its payload, or perform a special function such as provide access to a wireless network, survey a property, trim a tree, and the like. However, if its destination is within region 315, the drone passes through either perch 110E or 110F before entering the region. Thus, to pass from region 305 to region 315, the drone first passes through one of the perches 110A-D and is authorized by the corresponding drone verifier to enter region 310. The drone then passes through one of the perches 110E or 110F before entering region 315. If the drone does not pass either of these screenings, the perches 110 may either capture and hold the drone or instruct the drone to leave the region—e.g., return to its departure point or home base.

In one embodiment, to move from an inner region to an outer region, the drone does not need to pass through the perches 110. That is, to move from region 315 to region 310 or from region 310 to region 305, the drone may do so without first being authorized by a perch 110. This is permitted since the rules governing drones are more restrictive for the inner regions than the outer regions. Thus, if a drone is permitted to travel in an inner region, the drone is automatically approved to travel in the outer regions. However, this might not be the case for all neighboring regions. For example, if region 310 included an airport at site 320, all drone entering region 310 may first pass through one of the perches 110 regardless if the drone is entering from region 315 or region 305. For example, the airport may have special rules that are applicable when in region 310 but not when a drone is in regions 305 or 315. Thus, in this example, the drone must pass through either perch 110E or 110F when leaving region 315 and entering region 310. As such, perches 110E and 110F may be configured to test for the criteria corresponding to region 315 when a drone enters from region 310 and to test for the criteria corresponding to region 310 when a drone enters from region 315. The functions of takeoff and landing sites could be interchangeable, and conveyer 115 could be bidirectional in this case.

In one embodiment, the regions may be active at some times but inactive during others. For example, region 315 may be established only when a sporting event is occurring at site 325. However, at other times region 315 is deactivated, and thus, drones need only satisfy the rules governing region 310 to enter into region 315. The current status of the regions (and the boundaries of the regions) may be broadcast to the drones from the screening perches 110. For example, if region 315 is currently inactive, the screening perches 110E and 110F may indicate they are also inactive, and thus, any drone already authorized to enter region 310 can freely enter region 315.

Figure 4:
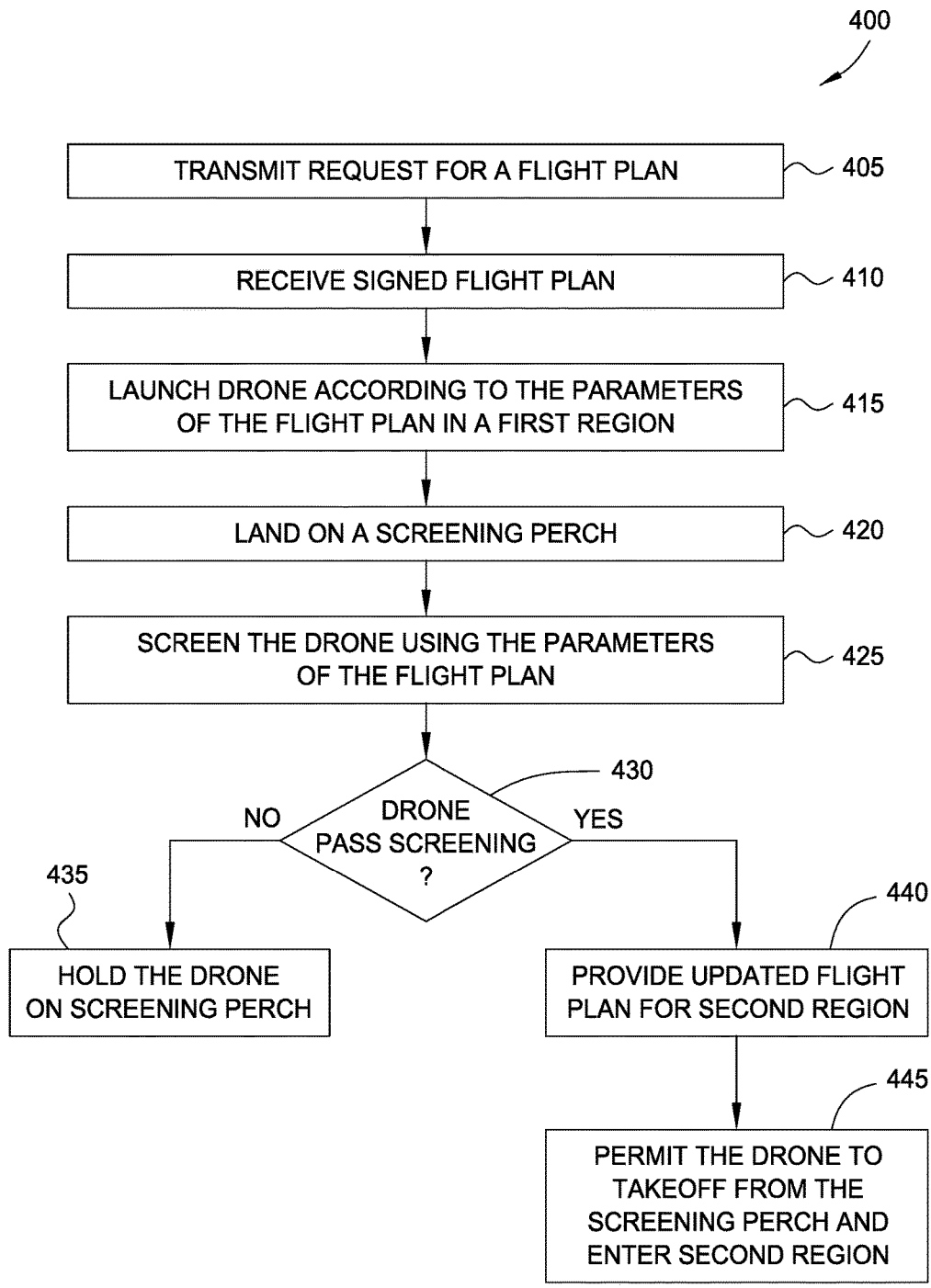
FIG. 4 is a flowchart of screening a drone before entering a restricted geographic region, according to one embodiment described herein.

FIG. 4 is a flowchart of a method 400 for screening a drone before entering a restricted geographic region, according to one embodiment described herein. At block 405, a drone operator transmits a request for a flight plan. For example, the drone operator may be a business operator that receives an order to be delivered using the drone (e.g., an order for a commercial product or takeout food). In another embodiment, the order may be for a drone to perform a specific service or function such as survey a property, provide additional cell network coverage, retrieve an object, photography, and the like.

The request for the flight plan may be similar to a request made by a pilot when flying an airplane. The request may indicate the origin and destination of the drone—i.e., where the drone is currently located and its desired destination (or destinations). The request may also describe the type of payload or cargo the drone will carry such as the weight of the payload, the item or items in the payload, and the like. The request may dictate when the drone operator would like to launch the drone and can include a proposed route between the origin and destination. Furthermore, the request may include an ID of the drone such as a tail number or electronic signature as well as the technical aspects of the drone such as its flight controller software, hardware, payload capabilities, battery, number of propellers, etc.

In one embodiment, the request for the flight plan may be derived from a preapproved template. For example, a business that operates drones may use a flight plan template that is approved for the type of services provided by its drones, whether it is to deliver takeout food, trim a tree, or provide cell service. Once the business is approved, an authorized entity that issues the flight plans provides the template to the business owner which can then update the template each time a drone is dispatched. By using the template, the time required for reviewing and approving the flight plan may be shortened since government agency already knows the purpose of the drone trip as well as knowing that the business has already been approved to operate drones for a specific purpose or purposes.

At block 410, the drone operator receives a signed flight plan for the drone. If the destination of the drone is within a restricted region, e.g., regions 310 or 315 shown in FIG. 3—the flight plan may provide a path the drone should fly from its origin to one of the perches 110. That is, instead of providing a route from the origin to the destination in the restricted region, the flight plan instructs the drone to first fly to one of the perches 110 (e.g., the perch closest to the drone's current location) for screening. The route indicated in the flight plan may be uploaded into the flight controller of the drone which permits the drone to autonomously fly along the route, or the drone operator may manually fly the drone along the route.

In one embodiment, the flight plan is issued by a government agency—e.g., the agency that controls the airspace. The request for the flight plan may be reviewed by a human employee of the agency or may be approved automatically if the request satisfies predefined criteria such as the payload does not exceed a certain percentage of the total weight, the drone operator has already been approved to operate drones for a specific purpose, the airspace is not congested, the flight path avoids commercial aircraft, and the like. However, in another embodiment, the flight plan is issued by a private entity. For example, if the drone operator wants to deliver food to an employee on a university or company campus, the private entity may require all drones to receive a flight plan before entering its airspace. In this example, the private entity may control the perches used to screen drones before the drones are permitted to enter its campus.

Moreover, the flight plan may be signed digitally by the entity that issued the plan. The signed flight plan can be stored in the drone and evaluated by the screening perch to validate the flight plan. That is, by evaluating a digital certificate corresponding to the flight plan, the perch can determine if the flight plan was properly authorized or is fraudulent. This evaluation may include cryptographic validation of digital signatures.

At block 415, assuming the flight plan was issued, the drone operator launches the drone according to the parameters of the flight plan in a first region. Put differently, the flight plan may be tailored to follow any restrictions for operating the drone in the first geographic region. If this region includes tall buildings, the flight plan may instruct the drone to stay at least 20 meters from all buildings taller than 40 meters. Moreover, the flight plan may provide a route to the drone that avoids heavily populated areas in the first region.

At block 420, the drone uses the flight plan to land on a screening perch that controls drone access between the first region and a second region. At block 425, the perch screens the drone using the parameters of the flight plan. As described above, the screening perch may include sensors for detecting the weight of the payload, the material in the payload, hazardous or dangerous materials, contraband, and the like.

In one embodiment, the drone verifier correlates data outputted from a sensor in the perch with information in the flight plan in order to validate the drone. The drone verifier may ensure the payload indicated on the flight plan matches the payload detected using the sensors. For example, if the flight plan says the drone is carrying takeout food but a millimeter wave scanner identifies a large metal object in the payload, the drone verifier may not let the drone continue into the second region. In addition, the drone verifier may check the ID of the drone from, e.g., its tail number, and ensure the ID matches the ID in the flight plan.

Moreover, the drone verifier may establish wireless or wired communication with the drone to certify its hardware and software meet certain requirements of the second region. For example, if the second region includes an airport, a government agency may require the drone have a flight controller and sensors for detecting and avoiding other flying objects. The drone verifier may compare the drone's hardware configuration and software version numbers to a database to validate that all required updates, recalls, and patches are correctly installed. Even if the drone has the appropriate hardware or software, the drone verifier may perform tests on the drone to ensure the control systems are active and functioning properly.

The drone verifier may also determine if the flight plan was digitally signed or has the correct digital certificate. Doing so ensures that a fraudulent flight plan was not uploaded onto the drone which falsely asserts the plan was approved by the entity responsible for issuing flight plans. In one example, scanning the drone includes evaluating a flight plan saved on the drone, or using the ID of the drone found by scanning the drone to lookup the flight plan issued to the drone to determine if the information in the flight plan matches the drone's payload. Cryptographic methods can insure the authenticity of digital signatures.

If the drone does not pass the screening performed by the perch, method 400 proceeds to block 435 where the screening perch holds the drone and prevents the drone from taking off. For example, the screening perch may include retaining elements (e.g., fasteners or electromagnets) that prevent the drone from leaving. In one embodiment, the screening perch may move the unauthorized drone to a storage location which permits the perch to screen other drones. In another embodiment, the drone operator is given the choice of having the drone released, under the stipulation that it will immediately return to its point of origin, and not enter the second region. In this case, screening perch can inform cloud based services that the drone is denied access so other elements of the traffic control network can track it to verify the drone does not enter the second region.

However, if the drone passed the screening process, method 400 proceeds to block 440 where the authorized entity provides an updated flight plan to the drone for the second region. That is, the drone receives a new flight plan that indicates the parameters for traveling through the second region. For example, the new flight plan may include a route for the drone to travel from the perch to either the drone's destination or to another perch for entering another restricted region. The new flight plan can include updated sets of altitude, speed, noise, and object avoidance rules.

At block 445, the perch permits the drone to takeoff and enter the second region. The perch deactivates the retaining elements and then instructs the flight controller on the drone (or a pilot remotely controlling the drone) that the drone can now travel in the second region.

Although the method 400 describes using a flight plan to travel through the first and second regions, in other embodiments, flight plans may not be used. For example, the first region may be a rural area where drones can be operated without restriction. However, if a drone operator wants to send a drone into a restricted geographic region, the operator instructs the drone to first travel to a screening perch. There, the perch may evaluate the drone to ensure the drone satisfies the criteria of the restricted geographic region, e.g., payload weight, flight controller software, no hazardous material, and the like. Once these tests are passed, the perch may then provide the drone with a digital certificate indicated the drone can travel in the restricted region. This information may also be passed to a drone-enforcement system which tracks the drones in the restricted region so that the enforcement system knows the drone has permission to travel in the region. In this manner, the screening perches may be used in a system that does not rely on an authorized entity to provide flight plans for drones in a restricted geographic region.

In the preceding, reference is made to embodiments presented in this disclosure. However, the scope of the present disclosure is not limited to specific described embodiments. Instead, any combination of the features and elements herein, whether related to different embodiments or not, is contemplated to implement and practice contemplated embodiments. Furthermore, although embodiments disclosed herein may achieve advantages over other possible solutions or over the prior art, whether or not a particular advantage is achieved by a given embodiment is not limiting of the scope of the present disclosure. Thus, the aspects, features, embodiments and advantages described herein are merely illustrative and are not considered elements or limitations of the appended claims except where explicitly recited in a claim(s). Likewise, reference to "the invention" shall not be construed as a generalization of any inventive subject matter disclosed herein and shall not be considered to be an element or limitation of the appended claims except where explicitly recited in a claim(s).

As will be appreciated by one skilled in the art, the embodiments disclosed herein may be embodied as a system, method or computer program product. Accordingly, aspects may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects may take the form of a computer program product embodied in one or more computer readable medium(s) having computer readable program code embodied thereon.

The present invention may be a system, a method, and/or a computer program product. The computer program product may include a computer readable storage medium (or media) having computer readable program instructions thereon for causing a processor to carry out aspects of the present invention.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium is any tangible medium that can contain, or store a program for use by or in connection with an instruction execution system, apparatus or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present disclosure may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present disclosure are described below with reference to flowchart illustrations and/or block diagrams of methods, apparatus (systems) and computer program products according to embodiments presented in this disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality and operation of possible implementations of systems, methods and computer program products according to various embodiments. In this regard, each block in the flowchart or block diagrams may represent a module, segment or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

In view of the foregoing, the scope of the present disclosure is determined by the claims that follow.

We claim:

1. A screening perch, comprising:
a landing site configured to receive a drone for screening, wherein the drone is an unmanned vehicle;
a sensor configured to scan at least a portion of the drone; and
a drone verifier communicatively coupled to the sensor and is configured to:
evaluate data outputted from the sensor when scanning the portion of the drone;
determine whether the data satisfies a predefined criteria corresponding to a restricted geographic region; and
upon determining the predefined criteria is satisfied, permit the drone to enter the restricted geographic region.

2. The screening perch of claim 1, further comprising:
a takeoff site; and
an actuator configured to move the drone from the landing site to the takeoff site.

3. The screening perch of claim 2, wherein the sensor is disposed along a path defined by the actuator, wherein moving the drone along the path passes the drone through a sensing region of the sensor.

4. The screening perch of claim 1, wherein the sensor is configured to detect at least one hazardous materials and contraband on the drone.

5. The screening perch of claim 1, wherein the sensor comprises an antenna for wirelessly communicating with the drone, wherein the drone verifier is configured to:
communicate with the drone to identify an attribute of a flight controller disposed on the drone; and
determine whether the flight controller satisfies the predefined criteria corresponding to the restricted geographic region.

6. The screening perch of claim 1, wherein the drone verifier is configured to:
identify a flight plan assigned to the drone;
correlate the data outputted from the sensor with information in the flight plan to validate the drone; and
permit the drone to enter the restricted geographic region upon determining the drone is valid.

7. The screening perch of claim 1, wherein the drone verifier is configured to:
upon determining the predefined criteria is satisfied, transmit a message instructing that a flight plan be provided to the drone, the flight plan indicating a route of the drone in the restricted geographic region.

8. The screening perch of claim 1, further comprising:
retaining elements configured to hold the drone on the screening perch, wherein the drone verifier is configured to:
deactivate the retaining elements to permit the drone to leave the screening perch upon determining the predefined criteria is satisfied.

9. A drone screening system, comprising:
a plurality of screening perches disposed at a shared boundary between a first geographic region and a second geographic region, wherein each of the plurality of screening perches comprises:
a sensor configured to scan at least a portion of a drone, wherein the drone is an unmanned vehicle; and
a drone verifier configured to authorize the drone to travel from the first geographic region to the second geographic region based on data outputted by the sensor.

10. The drone screening system of claim 9, wherein each of the plurality of screening perches comprises:
a landing site;
a takeoff site; and
an actuator configured to move the drone from the landing site to the takeoff site.

11. The drone screening system of claim 10, wherein the sensor is disposed along a path defined by the actuator, wherein moving the drone along the path passes the drone through a sensing region of the sensor.

12. The drone screening system of claim 9, wherein the sensor is configured to detect hazardous materials on the drone.

13. The drone screening system of claim 9, wherein the sensor comprises an antenna for wirelessly communicating with the drone, wherein the drone verifier is configured to:
communicate with the drone to identify an attribute of a flight controller disposed on the drone; and
determine whether the flight controller satisfies predefined criteria corresponding to the second geographic region.

14. The drone screening system of claim 9, wherein any one of the plurality of screening perches can authorize the drone to travel from the first geographic region to the second geographic region.

15. The drone screening system of claim 9, wherein the second geographic region has more restrictive rules for operating drones than the first geographic region.

16. A method, comprising:
receiving a drone at a screening perch, wherein the drone is an unmanned vehicle;
scanning at least a portion of the drone;
evaluating data outputted when scanning the portion of the drone;
determining whether the data satisfies a predefined criteria corresponding to a restricted geographic region; and
upon determining the predefined criteria is satisfied, permitting the drone to leave the screening perch and enter the restricted geographic region.

17. The method of claim 16, further comprising:
moving the drone using an actuator on the screening perch in order to scan the portion of the drone.

18. The method of claim 16, further comprising:
communicating with the drone to identify an attribute of a flight controller disposed on the drone; and
determining whether the flight controller satisfies the predefined criteria corresponding to the restricted geographic region.

19. The method of claim 16, further comprising:
identifying a flight plan assigned to the drone;
correlating the data from scanning the drone with information in the flight plan to validate the drone; and
permitting the drone to enter the restricted geographic region upon determining the drone is valid.

20. The method of claim 16, further comprising:
securing the drone to the screening perch using retaining elements when scanning the drone and evaluating the data outputted when scanning the drone;
deactivating the retaining elements upon determining the predefined criteria is satisfied;
securing a different drone to the screening perch using the retaining elements when scanning the different drone and evaluating the data outputted when scanning the different drone; and
preventing the different drone from leaving the screening perch using the retaining elements upon determining predefined criteria is not satisfied when scanning the different drone.

* * * * *